US006043931A

United States Patent [19]
Jourdan et al.

[11] Patent Number: 6,043,931
[45] Date of Patent: Mar. 28, 2000

[54] OPTICAL TRANSMISSION SYSTEM WITH DYNAMIC COMPENSATION OF THE POWER TRANSMITTED

[75] Inventors: Amaury Jourdan, Sevres; Michel Sotom; Franck Bruyere, both of Paris; Guy Soulage, Vitry sur Seine, all of France

[73] Assignee: Alcatel, Paris, France

[21] Appl. No.: 09/085,106

[22] Filed: May 28, 1998

[30] Foreign Application Priority Data

May 29, 1997 [FR] France .................................. 97 06592

[51] Int. Cl.[7] ........................................ H01S 3/00
[52] U.S. Cl. .................................... 359/341; 359/161
[58] Field of Search ............................ 359/341, 161, 359/124

[56] References Cited

U.S. PATENT DOCUMENTS 5,793,512 8/1998 Ryu ........................................ 359/179

FOREIGN PATENT DOCUMENTS

0639876A1 2/1995 European Pat. Off. .

OTHER PUBLICATIONS

R. Schnabel et al, "Wavelength Conversion and Switching of High Speed Data Signals Using Semiconductor Laser Amplifiers", Electronics Letters, vol. 29, No. 23, Nov. 11, 1993, pp. 2047–2048.

*Primary Examiner*—Mark Hellner
*Attorney, Agent, or Firm*—Sughrue, Mion, Zinn Macpeak & Seas, PLLC

[57] ABSTRACT

The invention relates to an optical transmission system comprising a transmission line which includes at least one optical fiber amplifier. According to the invention, a stabilized gain optical amplifier is coupled to the input of the line, said stabilized gain amplifier including a local oscillator suitable for emitting an auxiliary compensation wave at a wavelength λloc which lies in the gain band of each optical fiber amplifier of the line. Provision is also made to modulate the pumping current of said stabilized gain amplifier to convey service information. The invention is applicable to optical transmission.

7 Claims, 3 Drawing Sheets

FIG_1
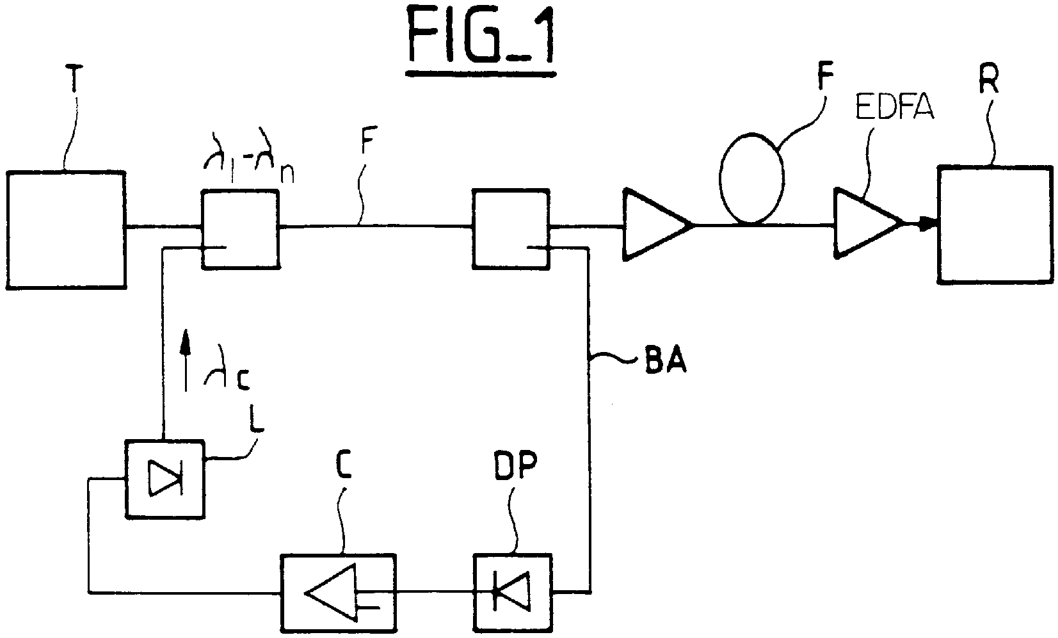
FIG_2
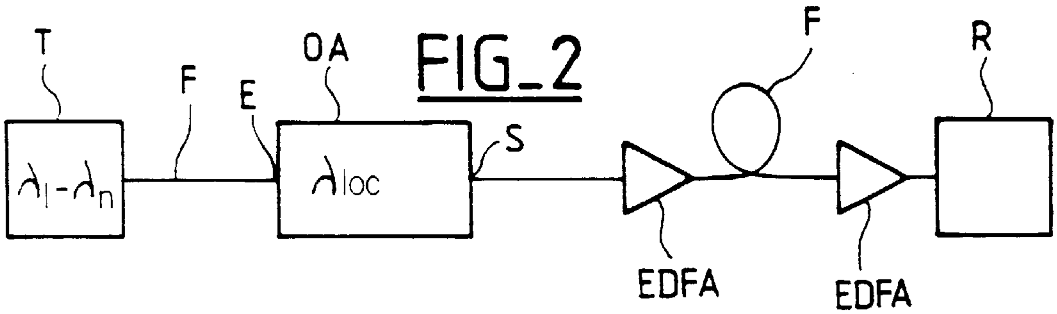
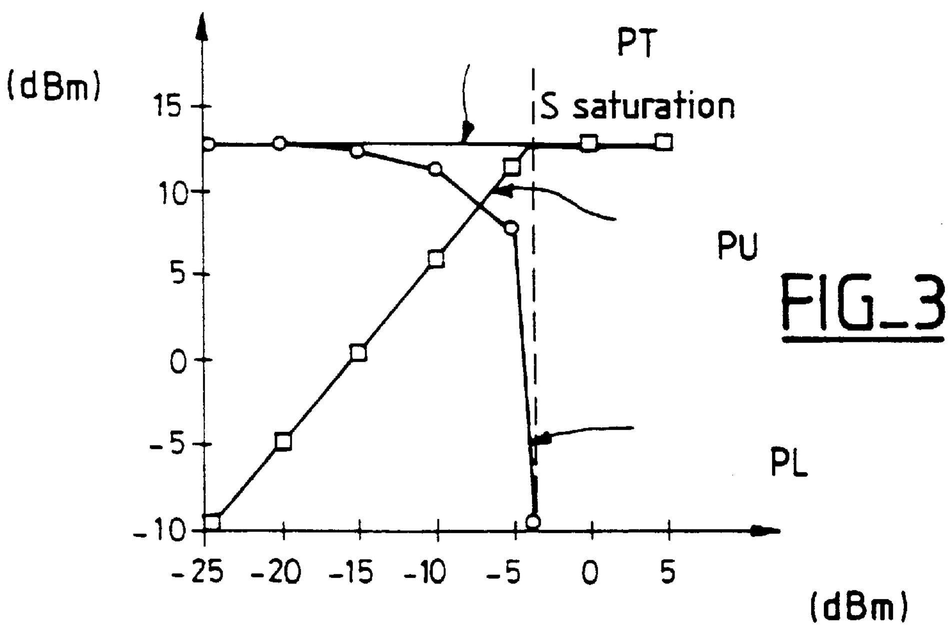
FIG_3

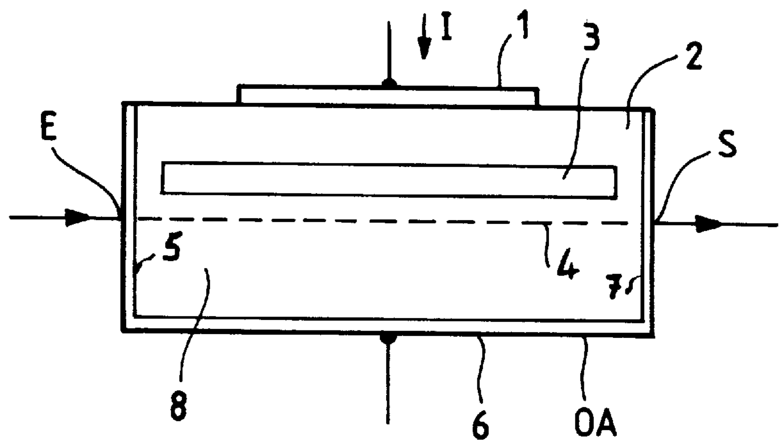
FIG_4
FIG_5
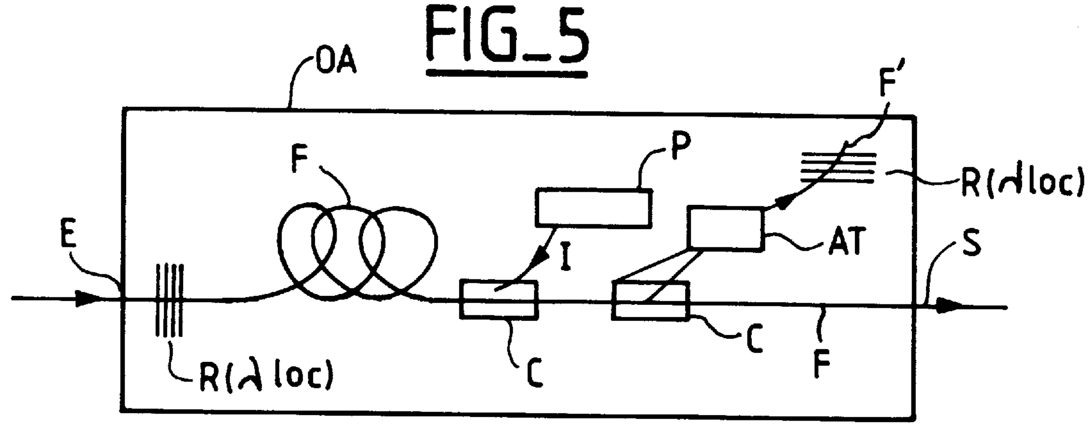
FIG_6
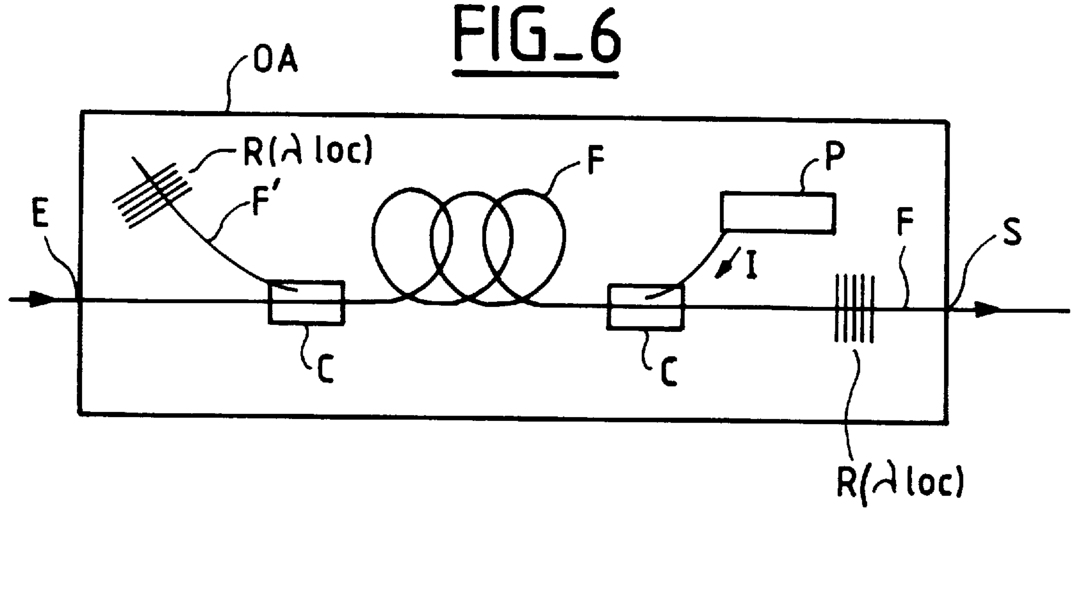

FIG_7
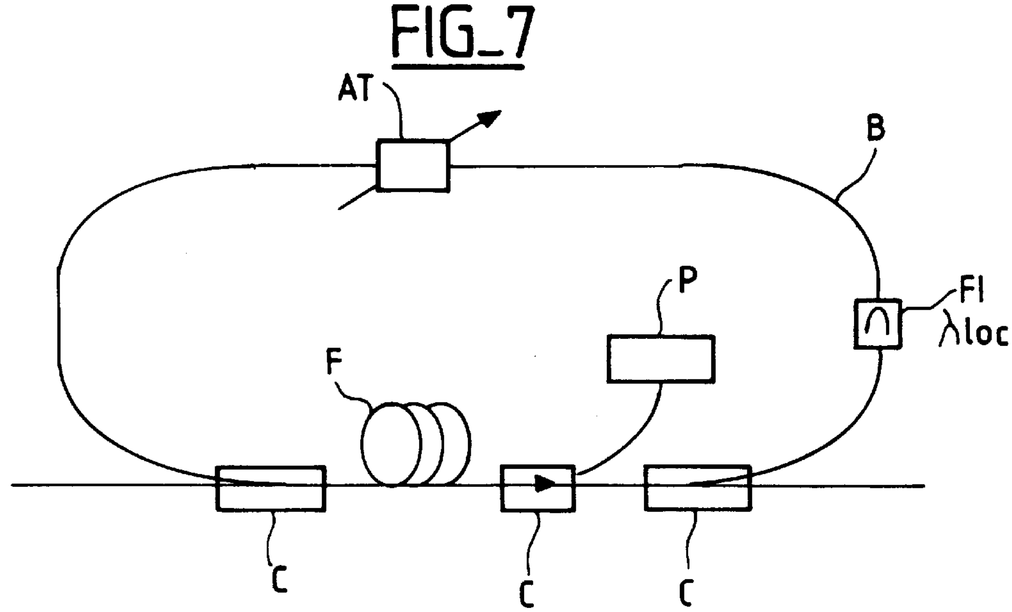
FIG_8
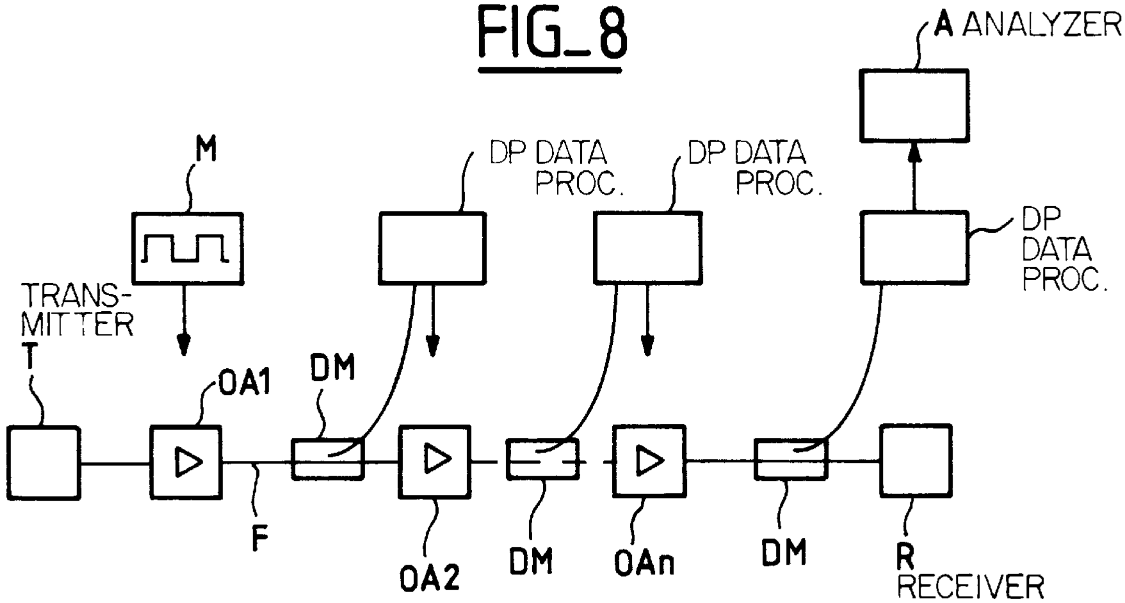

OPTICAL TRANSMISSION SYSTEM WITH DYNAMIC COMPENSATION OF THE POWER TRANSMITTED

The invention relates to an optical transmission system with dynamic compensation of the power transmitted, and in particular a transmission system operating by wavelength division multiplexing.

BACKGROUND OF THE INVENTION

Nowadays, optical transmission lines convey signals which are wavelength multiplexed. These signals are amplified all along their transmission by optical fiber amplifiers.

The present trend is to make ever increasing use of optical solutions for performing all of the transmission over a transmission network.

In a transmission network, there are not only transmission functions proper, but also routing, configuration, or reconfiguration functions for conveying information to a given outlet point from the network.

Unfortunately, when transmission is performed over a network, heavy traffic or other reasons can make it necessary to reconfigure the network in appropriate locations, thereby changing the number of transmission channels which propagate over optical transmission lines and which are amplified by the optical fiber amplifiers all along said lines.

Optical fiber amplifiers, and more particularly erbium-doped fiber amplifiers, are used on optical transmission lines since they do not present gain non-linearity as a function of the power of the input signal at the modulation frequencies of the signals used in telecommunications systems.

The gain recovery time in an erbium-doped fiber amplifier is greater than 0.1 ms. This long recovery time serves to stabilize gain since gain does not have the time to rise when the signal passes from a high state to a low state at the modulation frequencies used in telecommunications which are of the order of 100 MHz to 10 GHz.

Unfortunately, it has been observed that when the number of transmission channels present at the input to an optical fiber amplifier is changed, that has the effect of saturating or desaturating the amplifier which leads to a transient phenomenon. The gain of the amplifier varies in transient manner and the total power in the output signal drops.

This phenomenon is troublesome since it means that for a very short length of time, typically several tens of microseconds, the power of the channels actually in use is changed and, unfortunately, that can lead to transmission errors.

To solve this problem, the state of the art proposes a system shown as a block diagram in FIG. 1.

The terminal T represents an transmitter or a routing node in the network, and terminal R represents a receiver or some other routing node in the network. Erbium-doped fiber amplifiers (EDFAS) are present in the receivers located all along the line between its access and outlet points T and R.

That system makes use of a laser source L($\lambda c$) placed at the input of line F and having output power that is servo-controlled by its current feed so that the total power of the useful signal plus the power of the signal emitted by the laser remains constant. For that purpose, a servo-control loop BA picks up a small fraction of the total power of the signals to enable detector means DP to detect the level of the total power transmitted over the line and to apply feedback to the current through the laser L.

The laser L is selected to operate at a wavelength $\lambda c$ that is different from the wavelengths of the channels used $\lambda 1$–$\lambda n$.

Thus, supposing there are five channels and that for routing reasons three of the channels are removed, then the laser regulation loop will increase the output power of the laser so that the power of the two remaining channels plus that of the laser corresponds to the power of the five initial channels.

The drawback of that solution is to introduce an additional component which is a laser diode and a fast electronic feedback loop including a circuit for controlling the laser. That solution is relatively complex and expensive.

OBJECTS AND SUMMARY OF THE INVENTION

The present invention makes it possible to remedy those drawbacks and it proposes a system that is reliable and not very complex.

The present invention provides an optical transmission system comprising a transmission line having at least one optical fiber amplifier, wherein a stabilized gain optical amplifier is coupled to the input of the line, said stabilized gain amplifier including a local oscillator suitable for emitting an auxiliary compensation wave at a wavelength $\lambda loc$ that lies within the gain band of each optical fiber amplifier of the line.

According to another characteristic of the invention, the stabilized gain optical amplifier is a semiconductor optical amplifier having a light guide coupled to the local oscillator, said oscillator including at least one distributed grating at a Bragg wavelength equal to the wavelength $\lambda loc$ selected for the oscillation.

According to another characteristic, the stabilized gain amplifier is an optical fiber amplifier doped with a rare earth, pumping current being injected into the fiber to obtain an amplifying medium, said amplifier comprising, around said medium, a laser cavity of wavelength $\lambda loc$ selected for the oscillation.

In a first variant, the laser cavity is obtained by two Bragg gratings placed on either side of the amplifying medium.

In a second variant, the cavity is implemented by an optical loop coupled to the fiber amplifier, and comprising a filter centered on the wavelength selected for the oscillation $\lambda loc$ followed by an attenuator.

According to another characteristic, it includes modulator means for modulating the pumping current injected into the stabilized gain amplifier placed at the input of the line with service information to be transmitted, and means for detecting and processing the signal at the modulated local wavelength $\lambda loc$, which means are placed at output points from the line.

According to another characteristic of this optical transmission system, the transmission line includes a plurality of stabilized gain optical amplifiers, and modulator means are provided for modulating the pumping current injected into each stabilized gain amplifier, together with means for detecting the signal at the local wavelength $\lambda loc$ and for processing said signal.

BRIEF DESCRIPTION OF THE DRAWINGS

The present invention will be better understood on reading the following description which is given by way of non-limiting illustration with reference to the accompanying drawings, in which:

FIG. 1 is a block diagram of a prior art transmission system;

FIG. 2 is a block diagram of a transmission system of the invention;

FIG. 3 shows how power varies at the input and the output of the system;

FIG. 4 is a diagram of a first embodiment of the invention;

FIG. 5 is a diagram of a second embodiment of the invention;

FIG. 6 is a diagram of a variant of FIG. 5;

FIG. 7 is a diagram of another variant of the invention; and

FIG. 8 is a diagram of a transmission system constituting a particular application of the invention.

MORE DETAILED DESCRIPTION

Throughout the description, the same elements are given the same references.

A transmission system of the invention is shown by the diagram of FIG. 2.

This system comprises a stabilized gain optical amplifier OA placed after the transmitter T (or after each routing node if T is a routing node). This amplifier may advantageously replace the optical fiber amplifier normally placed at this location.

The stabilized gain optical amplifier OA is selected to generate a local oscillation λloc at a wavelength that is different from any of the wavelengths of the transmission channels λ1–λn.

The total output power from the stabilized gain amplifier corresponds to the power of the signals of the channels applied to its input plus the signal power of the wave generated by the laser cavity of the amplifier OA.

It is recalled that a stabilized gain optical amplifier is an amplifier in which feedback is created so that a laser cavity is established around an amplifying medium so that oscillation takes place inside the cavity. When oscillation occurs inside the cavity then laser oscillator operation is taking place. A laser oscillator operates in such a manner that below the threshold of said laser, the gain of the cavity remains constant.

The diagram of FIG. 3 illustrates the compensation phenomenon produced by the amplifier OA on the total output power.

This figure shows how the output power of the useful signal PU and the total output power PT vary as a function of the input power.

Since the amplifier is a stabilized gain amplifier, its gain is constant. The useful signal power PU varies in linear manner as a function of gain, and consequently an increase in input power corresponds to an increase in output power until the threshold of the laser is exceeded. When the threshold is exceeded, the laser extinguishes, gain is no longer stabilized, and the amplifier saturates (point S on the curve).

It can also be seen from this curve that the power PL of the local oscillator is subjected to an inverse curve. On approaching the threshold, the local oscillator power drops down to zero.

The sum of the two power curves corresponds to the curve for the total power PT output by the amplifier. This total power PT is constant, as can be seen in the figure.

The operating conditions of this component are selected to be below the threshold of the laser cavity so as to make it possible to obtain gain stabilization, while nevertheless remaining close to saturation.

Thus, since gain is stabilized, variations in the power of the input signal have no influence on the gain applied to said signal, so output power is constant (useful signal plus local oscillation).

The wavelength λloc of the laser cavity must be in the gain band of the amplifiers of the transmission line.

To ensure that the total power propagates throughout the line of amplifiers and that said power remains constant throughout the entire line, it is necessary for the useful signal to propagate together with the oscillation throughout the entire amplification system.

It is also necessary for this wavelength to be different from the wavelengths of the transmission channels used by the signals. This can be achieved by selecting a wavelength situated at the edge of the band (e.g. 1528 nm for a band that typically covers 1530 nm to 1560 nm, or possibly 1530 nm to 1562 nm).

Another solution consists in selecting a wavelength situated in the middle of the band, providing the band has a "hole" of several nm, with one or more wavelengths being omitted from the transmission comb.

The wavelength λloc is defined either by construction when the amplifier is made, or by adjustment, depending on the nature of the amplifier used.

The stabilized gain amplifier OA can be made in a first implementation by means of a semiconductor amplifier, and in a second implementation by means of an optical fiber. These two embodiments are shown in the diagrams of FIGS. 4 to 7 which are described below.

In addition to adjusting the wavelength selected for the local operator, action is also taken to adjust the power of the local oscillator to ensure that said power is not too great compared with the power of the signal. To this end, it is proposed to perform "coarse" adjustment followed by "fine" adjustment of its power.

The first or "coarse" adjustment is performed by placing a fixed attenuator element on wavelength λloc. By way of example, a demultiplexer or a filter can be used on wavelength λloc to attenuate only that fraction of the signal that is at this wavelength when using optical fiber amplifiers. This adjustment is performed by taking an element having higher reflectivity on one side than on the other when using a semiconductor amplifier.

In contrast, fine adjustment is performed by acting on the pumping current of the stabilized gain amplifier or on the pumping power, depending on whether the amplifier is a semiconductor amplifier or a fiber amplifier.

FIG. 4 shows an embodiment using a semiconductor amplifier comprising:

- two parallel electrodes 1 and 6, enabling an electrical pumping current I to be injected;
- a semiconductor substrate 8 constituted by an N type first semiconductor material extending between the electrodes 1 and 6;
- a confinement layer 2 constituted by the same first material, but with P+ doping, opposite to the doping of the substrate 8;
- a light guide 3 that is active over its entire length, having its longitudinal axis parallel to the electrodes 1 and 6; the light guide is made of a second semiconductor material of lattice constant matched to that of the first material and of refractive index that is greater than that of the first material;
- a distributed grating 4 extending along the entire length of the light guide 3, constituted by a thin layer of semiconductor material having a refractive index that is higher than that of the substrate 8 and that is periodically etched in a portion or through the entire thickness of said layer; and
- two cleaved faces 5 and 7 given antireflection treatment, and terminating the substrate 8 perpendicularly to the longitudinal axis of the light guide 3.

The pitch of the grating 4 is selected in such a manner that the Bragg wavelength of the grating lies in an amplification spectrum range of the semiconductor material of the active light guide 3.

A more detailed description of an amplifier of this type is to be found in European patent application EP 0 639 876, which is incorporated herein by reference.

In a second embodiment, the stabilized gain amplifier can be implemented by an optical fiber amplifier doped with a rare earth (erbium), with pumping current I being injected into the fiber to reach the amplifying medium, and a laser cavity being created around said amplifying medium, either by means of an optical loop B (cf. FIG. 7) or by adding Bragg gratings, e.g. etched on the fiber (cf. FIGS. 5 and 6).

A variant of the FIG. 5 embodiment is shown in FIG. 6.

FIG. 5 shows a stabilized gain fiber amplifier based on using Bragg gratings R etched (for example) on the optical fiber. A first grating is placed at the input E of the amplifier OA. The second grating is placed on a fiber F' that is coupled by means of an optical coupler C to the fiber F. An attenuator AT is placed between the coupler and the grating R to adjust gain, thus giving flexibility over the dynamic range of the component. The gratings R are selected, by construction, to have a wavelength λloc.

The pump P delivering the pumping current I is optically coupled to the fiber by an optical coupler C.

In FIG. 6 which shows a variant equivalent to the embodiment shown in FIG. 5, one of the gratings R (λloc) is placed on the transmission fiber F at the output S from the amplifier medium OA. The second grating R is placed on the fiber F' which is coupled to the fiber F at the input E of the amplifying medium.

In FIG. 7, a stabilized gain fiber amplifier is shown that is based on an optical loop B coupled to the fiber F by couplers C, including a tunable filter FI at the wavelength λloc followed by an attenuator AT for adjusting the power level of the reinjected signal at wavelength λloc.

In a particular application of the invention, the pumping current of the stabilized gain amplifier is modulated so as to create wave modulation of the wavelength of the local oscillation.

Such modulation can be used, for example, to convey service information from a transmitter terminal T to a receiver terminal R or from a transmission node to another node.

This modulation does not disturb the useful signal in any way since the gain of the amplifier is stabilized and consequently independent of the control current of the amplifier. As a result, normal operation of the amplifier is unchanged.

For this purpose, a modulator M is placed to act on the pumping current I of amplifier OA1 placed at the input of the line.

A demultiplexer DM at the service wavelength (the wavelength of the local oscillator of the amplifier OA) is inserted ahead of the following line amplifier. The following line amplifier is an optical amplifier placed at an output point from the line: either before the receiving terminal R, or all along the line before each line amplifier OA2, etc., . . . , as shown in FIG. 8.

However, for that purpose, it is appropriate to replace the fiber amplifiers of the line with stabilized gain optical amplifiers.

The demultiplexer DM is followed by a detection and processing device DP which detects the signal λloc and processes the detected signal to:

monitor the quality of the line between two amplifiers;

process service information and add new information concerning line quality of the upstream link; and modulate the pumping current of the following amplifier with new information.

At the output from the line, the detection and processing device DP may be coupled, for example, to a device A for analyzing the information conveyed at the wavelength λloc. Detection, processing, and analysis devices are commonly used for performing such processing.

We claim:

1. An optical transmission system comprising a transmission line having at least one optical fiber amplifier and carrying communication on at least one transmission channel, wherein a stabilized gain optical amplifier is coupled to an input of the line, said stabilized gain amplifier including a local oscillator suitable for emitting an auxiliary compensation wave at a wavelength λloc that lies within a gain band of each optical fiber amplifier of the line, and is different from any wavelengths of transmission channels of the system.

2. An optical transmission system comprising a transmission line having at least one optical fiber amplifier, wherein a stabilized gain optical amplifier is coupled to an input of the line, said stabilized gain amplifier including a local oscillator suitable for emitting an auxiliary compensation wave at a wavelength λloc that lies within a gain band of each optical fiber amplifier of the line;

wherein the stabilized gain optical amplifier is a semiconductor optical amplifier having a light guide coupled to the local oscillator, said oscillator including at least one distributed grating at a Bragg wavelength equal to the wavelength λloc selected for the oscillation.

3. An optical transmission system comprising a transmission line having at least one optical fiber amplifier, wherein a stabilized gain optical amplifier is coupled to an input of the line, said stabilized gain amplifier including a local oscillator suitable for emitting an auxiliary compensation wave at a wavelength λloc that lies within a gain band of each optical fiber amplifier of the line;

wherein the stabilized gain optical amplifier is an optical fiber amplifier doped with a rare earth element, pumping current being injected into the fiber to obtain an amplifying medium, said amplifier comprising, around said medium, a laser cavity of wavelength λloc selected for the oscillation.

4. An optical transmission system according to claim 3, wherein the laser cavity is obtained by two Bragg gratings placed on either side of the amplifying medium.

5. An optical transmission system according to claim 3, wherein the cavity is implemented by an optical loop coupled to the fiber amplifier, and comprising a filter centered on the wavelength selected for the oscillation λloc followed by an attenuator.

6. An optical transmission system according to claim 2, including modulator means for modulating the pumping current injected into the stabilized gain amplifier placed at the input of the line with service information to be transmitted, and means for detecting and processing the signal at the modulated local wavelength λloc, which means are placed at output points from the line.

7. An optical transmission system according to claim 6, wherein the transmission line includes a plurality of stabilized gain optical amplifiers, and wherein modulator means are provided for modulating the pumping current injected into each stabilized gain amplifier, together with means for detecting the signal at the local wavelength λloc and for processing said signal.

* * * * *